United States Patent [19]

Tsuchiyama et al.

[11] Patent Number: 4,559,910
[45] Date of Patent: Dec. 24, 1985

[54] CRANKSHAFT BEARING DEVICE FOR INTERNAL COMBUSTION ENGINE

[75] Inventors: Tadashi Tsuchiyama; Yoshiaki Hidaka, both of Saitama, Japan

[73] Assignee: Honda Giken Kogyo Kabushiki Kaisha, Tokyo, Japan

[21] Appl. No.: 553,694

[22] Filed: Nov. 21, 1983

[30] Foreign Application Priority Data

Nov. 24, 1982 [JP] Japan ................ 57-206659

[51] Int. Cl.$^4$ ............................................. F02F 7/00
[52] U.S. Cl. ............................. 123/195 R; 123/198 E; 474/139; 474/87; 384/432
[58] Field of Search ............ 123/195 R, 195 A, 90.31, 123/198 E; 384/288, 294, 429, 432, 437; 474/87, 205, 252, 139

[56] References Cited

U.S. PATENT DOCUMENTS

| 1,624,738 | 4/1927 | Jesperson | 123/195 A |
| 2,085,810 | 7/1937 | Ljungstrom | 123/195 A |
| 3,863,617 | 2/1975 | Thien et al. | 123/198 E |
| 3,955,654 | 5/1976 | Lemonnier | 123/195 A |
| 4,294,203 | 10/1981 | Jones | 123/195 R |
| 4,448,159 | 5/1984 | Hidaka et al. | 123/195 R |

FOREIGN PATENT DOCUMENTS 2030647 4/1980 United Kingdom ............ 123/195 R

Primary Examiner—Craig R. Feinberg
Assistant Examiner—David A. Okonsky
Attorney, Agent, or Firm—Lyon & Lyon

[57] ABSTRACT

The crankshaft of an internal combustion engine is supported in a split bearing assembly near one end of the crankshaft, with the lower half of the bearing assembly formed in a bearing holder secured to the engine block. An arcuate flange projects axially towards that end of the crankshaft. The flange underlies a crankshaft pulley which drives a timing belt. The arcuate surface of the flange is struck from a center offset from the crankshaft axis in order to provide clearance for the timing belt. The offset construction also improves the joint seal between the oil pan and the engine block.

3 Claims, 6 Drawing Figures

CRANKSHAFT BEARING DEVICE FOR INTERNAL COMBUSTION ENGINE

This invention relates to internal combustion engines and is particularly directed to improvement in a crankshaft bearing assembly in which a camshaft pulley and a pulley for auxiliary machinery such as an oil pump are driven by means of a timing belt from a pulley secured to the crankshaft.

The timing belt is wound to run on both the crankshaft pulley and the camshaft pulley and also to drive the pulley for the auxiliary machinery.

A split bearing assembly is provided on the cylinder block for supporting the crankshaft near one end, and the lower portion of the bearing is provided by a bearing holder secured to the cylinder block. The bearing holder has two functions in addition to forming the lower half of the split bearing assembly. The first of these functions is to shorten the overall length of the engine and crankshaft through the provision of an axially extending arcuate flange which encircles the lower portion of the outer circumference of the timing belt. The other function is to provide an effective seal between the bearing holder and the oil pan which is positioned under the cylinder block. However, if the arcuate mating surfaces of the bearing holder and oil pan are struck from the crankshaft axis the length of the seal between the mating surfaces is so long as to jeopardize effective sealing action (refer to the Arc A in FIG. 6). Moreover, the excessively large sealing area may make it possible to have blow-by gasses leak from the crank case. Another disadvantage is that the bearing holder is larger in size and weight.

The present invention overcomes these difficulties by providing a bearing holder flange with an arcuate surface struck from an arc offset with respect to the crankshaft axis. This avoids any interference between the timing belt and the bearing holder flange. It also shortens the length of seal between the oil pan and the engine block. The size and weight of the bearing holder are reduced.

Other objects and advantages will appear hereinafter.

Figure 1:
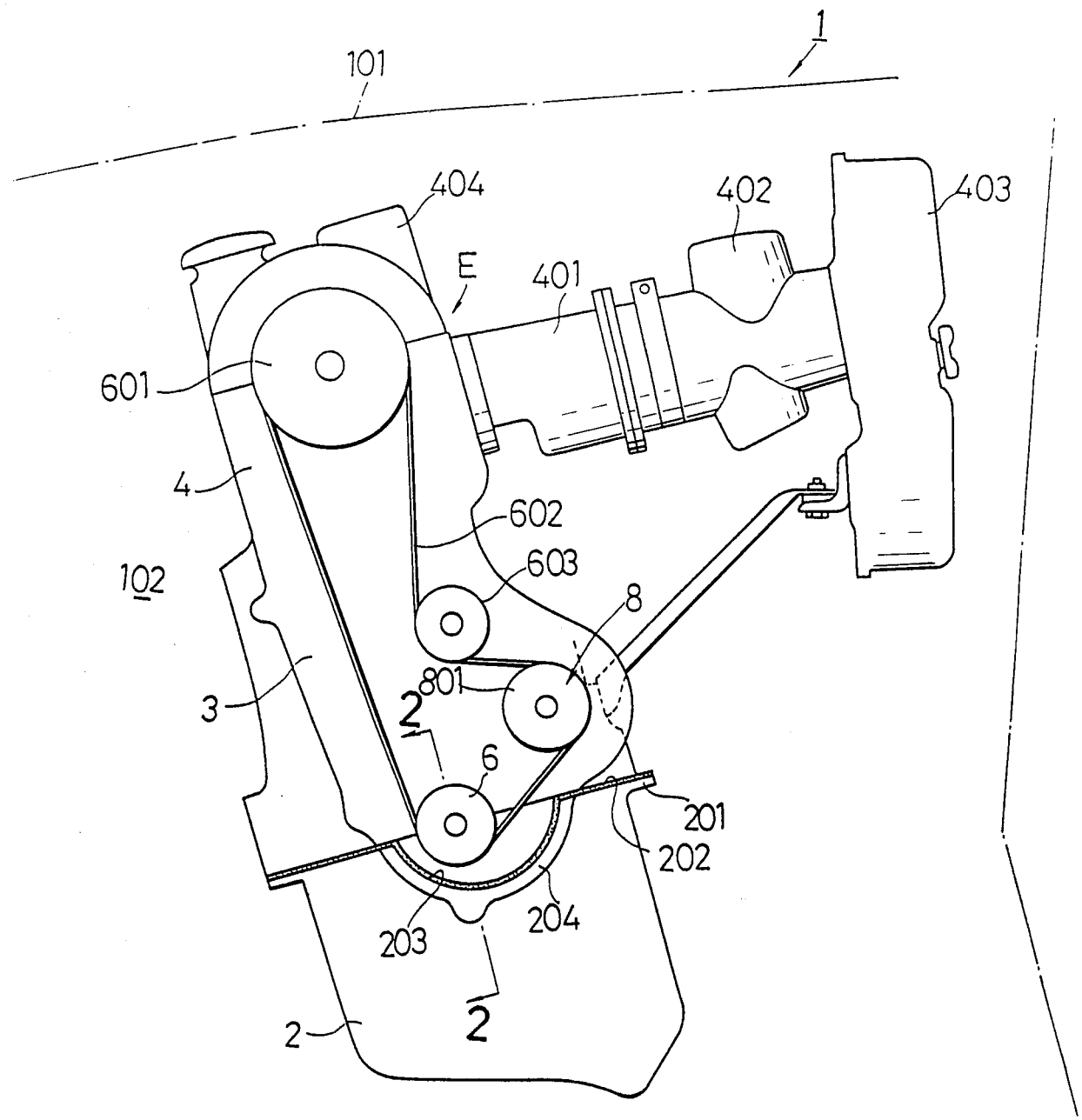
FIG. 1 is a side elevation in diagramatic form showing a side draft multi-cylinder engine.
Figure 2:
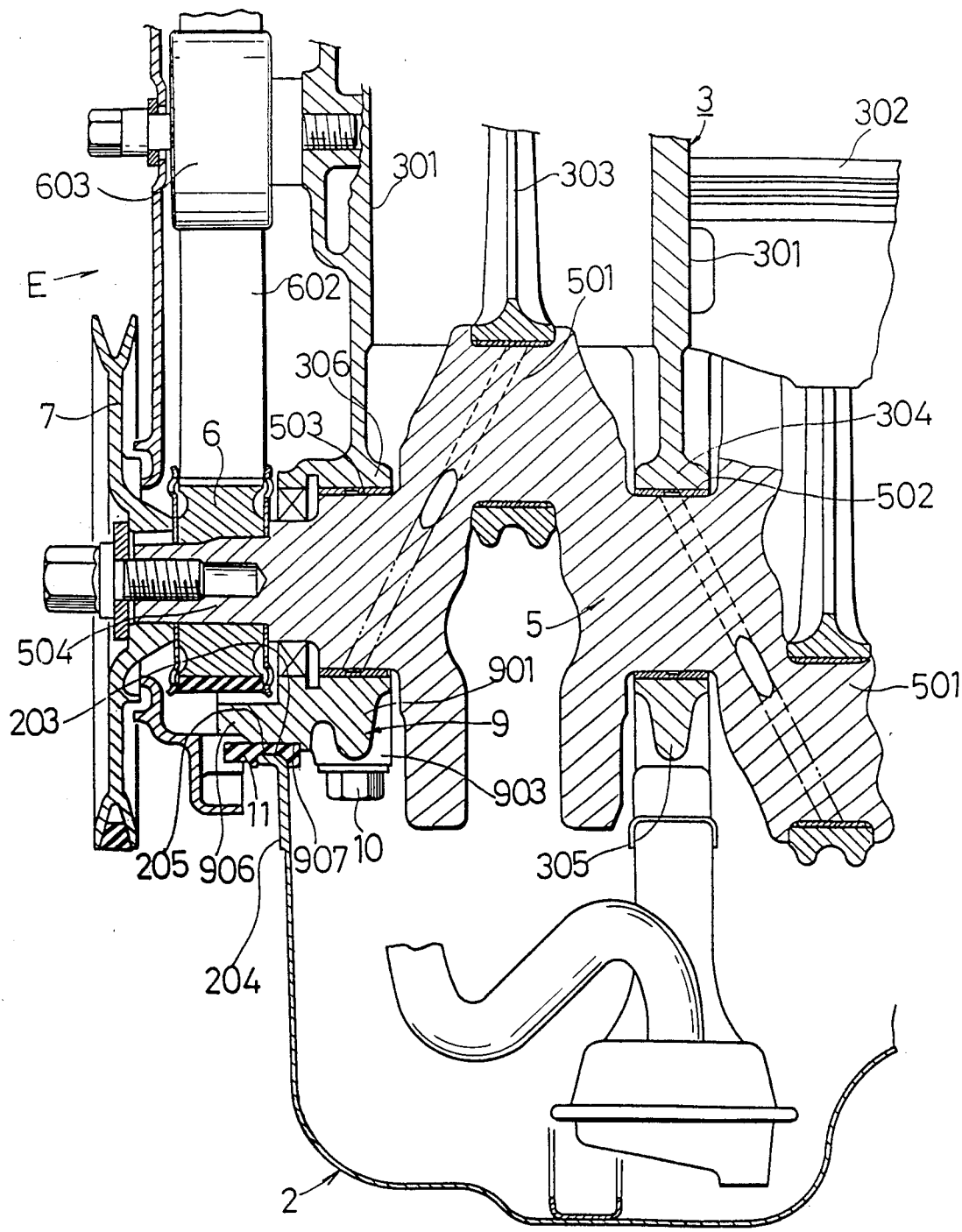
FIG. 2 is a side elevation taken substantially on the lines 2—2 as shown on FIG. 1, and showing a preferred embodiment of this invention.

Referring to the drawings, an engine E mounted on a vehicle 1 is positioned in an engine room 102 which can be opened and closed by means of a hinged bonnet connected to the front portion 101 of the vehicle 1. The engine illustrated is of the horizontal type in which the crankshaft is directed transversely of the direction of travel of the vehicle.

The four-cylinder engine E includes an oil pan 2, which forms a lower portion of the crankcase, a cylinder block 3 overlying the oil pan 2, and a cylinder head 4 and its cover 404 overlying the cylinder block 3. At the back of the cylinder head 4, there are positioned an intake pipe 401, a carburetor 402 and an air cleaner 403 forming together an intake system of the side draft type in which the intake passage is arranged generally horizontally.

The cylinder block 3 is formed at its intermediate and upper portions with cylinders 301, in which pistons 302 are fitted and are connected through connecting rods 303 to respective crankshaft pin portions 501. The crankshaft 5 has its journal portion 502 supported by both a bearing portion 304 in the lower portion of the cylinder block, and a bearing holder 305 which is secured to the bearing portion 304.

The cylinder block 3 is formed at a lower portion of one end with a semicircular bearing portion 306 opening downward. By this bearing portion 306 there is supported the upper half of a journal 503 which is located near one end of the crankshaft 5. A timing belt pulley 6 is coupled to a portion 504 of the crankshaft which extends outward from said journal 503 to form an extending end portion, to which a V-pulley 7 is coupled. The lower half of the journal 503 is supported by a bearing holder 9 which is secured under the cylinder block bearing portion. The timing belt pulley 6, which is secured to the extending portion 504 of the crankshaft 5 and disposed outside of the lower portion of the cylinder block 3, is connected, as shown in FIG. 1, through a timing belt 602 to a cam shaft pulley 601 which is disposed outside of the head cover 404 of the cylinder head 4. The timing belt 602 is so extended obliquely backward and upward as to run on a drive pulley 801 which is located at a rear upper portion of the outer side of the cylinder block 3 to drive an oil pump 8. A tension applier 603 is disposed in the belt passage extending between the oil pump driving pulley 801 and the cam shaft pulley 601. As a result, the timing belt 602 is so arranged under tension by the oil pump pulley 801 as to extend obliquely backward and upward of the drive pulley 6.

Figure 3:
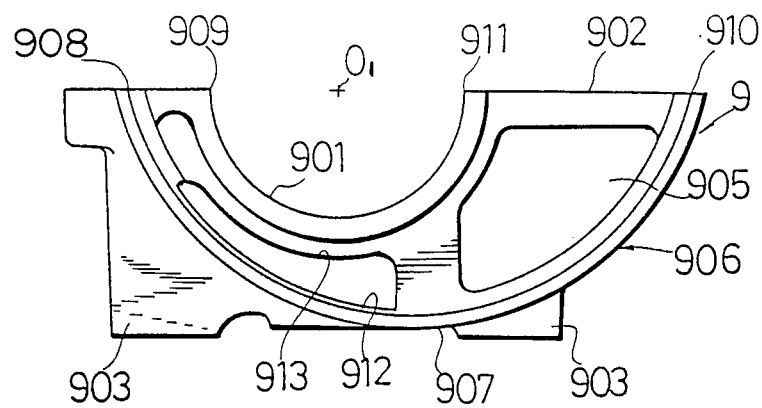
FIG. 3 is a side elevation showing one of the crankshaft bearing holders.
Figure 4:
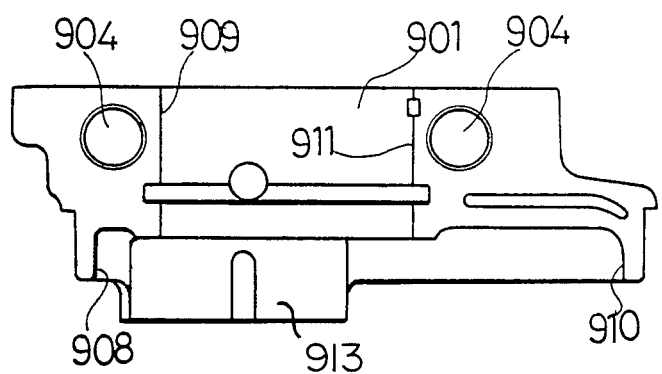
FIG. 4 is a top view of the device shown in FIG. 3.
Figure 5:
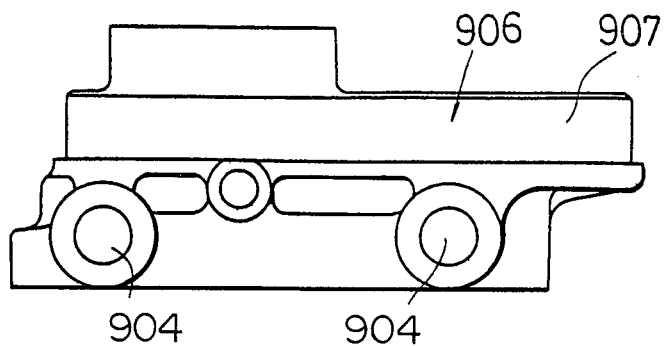
FIG. 5 is a bottom view of the device shown in FIGS. 3 and 4.

Details of the bearing holder 9 are shown in FIGS. 3 to 5. The bearing holder 9 is provided with a semicircular bearing portion 901 which receives the lower half of the journal portion 503 of the crankshaft 5. The bearing holder 9 is further provided with a flat abutment face 902 which extends from both the ends of the bearing portion 901. The bearing holder 9 is secured to the lower face of the cylinder block by bolts 10 extending upward into mounting holes 904 which are formed in boss portions 903. The bearing holder 9 as thus constructed has its body 905 formed on its outer boundary with an axially extending flange 906 which encircles the lower half of the pulley 6. A seating face is constructed on the outer boundary 907 of the flange 906.

In the description thus far presented, the bearing portion 901 of the bearing holder 9 is formed as an arc around the axis $O_1$ of the crankshaft 5. Also, the flange 906 of the bearing holder 9 is formed into such an arcuate shape as to bulge downward. The arc of the flange 906 thus formed has its center $O_2$ offset from the axis $O_1$ of the crankshaft 5 in a general horizontal direction toward the oil pump 8 and is positioned in an upwardly offset position. The arc of the flange 906 is drawn around the center $O_2$ thus offset. As is apparent from FIGS. 3 and 6, one horizontal end 908 of the flange 906 is close to an end portion 909 of the bearing 901 so that a predetermined clearance $S_1$ is held from the let-off side 602a of the timing belt 602, extending generally in a vertical direction. The other horizontal end 910 of the flange 906, i.e., the end portion at the oil pump side, is spaced from the end portion 911 of the bearing portion 901 so that a predetermined clearance $S_2$ is maintained between the end portion 910 and the tension side 602b of the belt 602, which extends obliquely backward and upward.

Moreover, a predetermined clearance $S_3$ is held between the belt 602 and the portion 912 of the flange 906, which is located just below the axis of the pulley 6. The clearances $S_1$, $S_2$ and $S_3$ thus defined are substantially identical so that those portions may not contact with the flange 906 while taking the huntings of the belt 603 into consideration. In the driving direction from below the pulley 6, incidentally, the flange 906 has about one quarter circumference positioned close to the outer circumference of the belt 602, thereby to provide portions 913 for preventing the belt 602 from coming out laterally from its proper path.

The periphery of the oil pan 2, which is attached to the lower portion of the cylinder block 3, is formed with a lip 201. The end portions 202 of the lip 201 are made concave to form a semicircular holder receiving portion 203 which is formed as an arc concentric to the flange 906 of the bearing holder 9. The holder receiving portion 203 thus formed has its outer perimeter reinforced by means of a portion 204 of additional thickness. Thus, the oil pan 2 is secured to the cylinder block 3 by placing the flange 906 on the receiving portion 203 and by sandwiching a sealing member 11 between the seating face 907 and the seating face 205.

Figure 6:
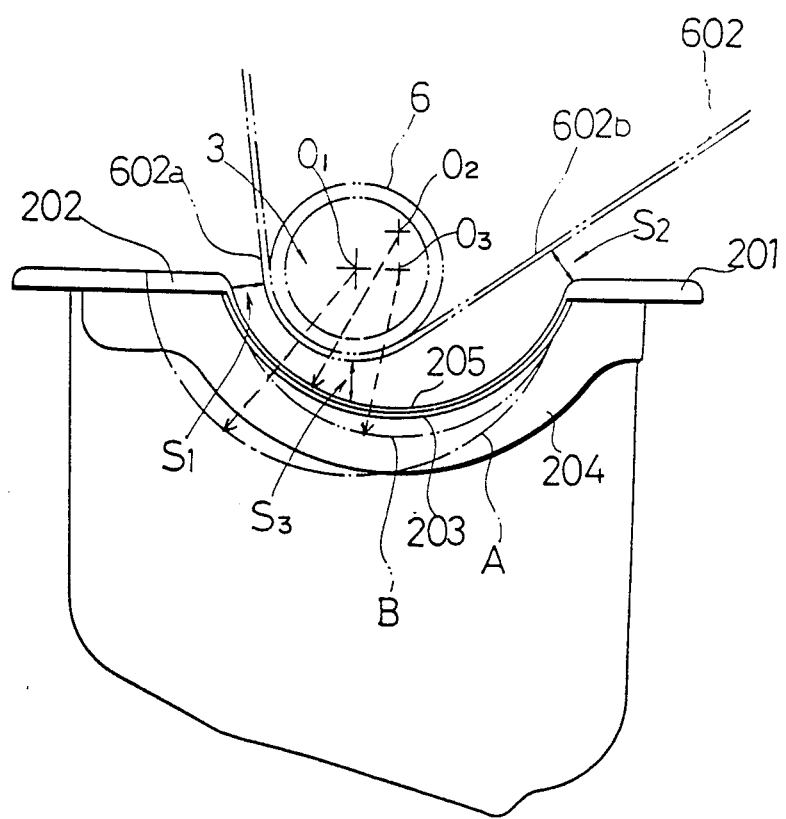
FIG. 6 is a schematic diagram showing the relative locations of the crankshaft axis and centers of arc of certain clearance surfaces.

In the embodiment thus far described, the centers of the flange 906 and the arc of the holder receiving portion 203 of the oil pan are located at $O_2$. As shown in FIG. 6, however, the arc B may be made such that it is located around the center $O_3$ shifted as it is from the axis $O_1$ of the crankshaft toward the oil pump 8. In this case, as indicated by the arc B, the flange and the holder receiving portion are deepened so that the bearing holder is more or less enlarged. In the embodiment, moreover, the auxiliary machinery is exemplified by the oil pump, to which the present invention should not be limited but may be arbitrary. Moreover, the cam shaft may be exclusively driven without driving the auxiliary machinery. The layout of a particular design may include a construction in which either the let-off side or the tensile side of the belt is not vertical but is extended obliquely upward.

As is now apparent from the description thus far made, according to the present invention, the flange 906 of the crankshaft bearing holder 9 partially encircles the timing belt driving pulley 6, thereby saving axial space. Also, the flange 906 is provided with a surface 907 against which seal 11 and oil pan lip 201 are secured. While ensuring the aforementioned effects, it is possible to avoid any interferences between the timing belt, which is let off and tensioned obliquely upward, and the flange of the bearing holder. Also, it makes it possible to construct a bearing holder having as small size and weight as possible.

Having fully described our invention, it is to be understood that we are not to be limited to the details herein set forth but that our invention is of the full scope of the appended claims.

We claim:

1. In an internal combustion engine having a crankshaft, and having a camshaft pulley driven from a crankshaft pulley by means of a timing belt having one side extending directly to the camshaft pulley and other side extending obliquely at a substantial angle to the one side, the improvement comprising, in combination: a cylinder block having a split bearing for supporting the crankshaft near one end thereof, said split bearing including a semicircular bearing holder secured to said cylinder block, said bearing holder having a flange projecting axially of the crankshaft toward said end thereof and underlying a portion of the crankshaft pulley, said flange having an arcuate portion struck from a location offcenter from the axis of the crankshaft to provide clearance for the obliquely extending side of the timing belt extending from said crankshaft pulley.

2. In an internal combustion engine having a crankshaft, and having a camshaft pulley driven from a crankshaft pulley by means of a timing belt having one side extending directly to the camshaft pulley and other side extending obliquely at a substantial angle to the one side, the improvement comprising, in combination: an auxiliary machinery pulley also driven by said timing belt directly from the crankshaft pulley by the obliquely extending side of said timing belt, a cylinder block having a split bearing for supporting the crankshaft near one end thereof, said split bearing including a semicircular bearing holder secured to said cylinder block, said bearing holder having a flange projecting axially at the crankshaft toward said end thereof and underlying a portion of the crankshaft pulley, said flange having an arcuate portion struck from a location offcenter from the axis of the crankshaft to provide clearance for that said other side of the timing belt extending obliquely between said crankshaft pulley and said auxiliary machinery pulley.

3. In an internal combustion engine having a crankshaft, and having a camshaft pulley driven from a crankshaft pulley by means of a timing belt having one side extending directly to the camshaft pulley and other side extending obliquely at a substantial angle to the one side, the improvement comprising, in combination: an auxiliary machinery pulley also driven by said timing belt directly from the crankshaft pulley by the obliquely extending side of said timing belt, a cylinder block having a split bearing for supporting the crankshaft near one end thereof, said split bearing including a semicircular bearing holder secured to said cylinder block, said bearing holder having a flange projecting axially of the crankshaft toward said end thereof, said flange having an arcuate portion struck from a location offcenter from the axis of the crankshaft to provide clearance for that said other side of the timing belt extending obliquely between said crankshaft pulley and said auxiliary machinery pulley, said flange underlying a portion of said crankshaft pulley, and an oil pan having a peripheral lip and a sealing element interposed between said flange and said slip.

* * * * *